(12) United States Patent
Ramakrishna

(10) Patent No.: US 9,948,424 B2
(45) Date of Patent: Apr. 17, 2018

(54) SYSTEM AND METHOD FOR REDUCING BLIND DECODING COMPLEXITY IN OFDMA-BASED SYSTEMS

(75) Inventor: Sudhir Ramakrishna, Plano, TX (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 894 days.

(21) Appl. No.: 12/749,367

(22) Filed: Mar. 29, 2010

(65) Prior Publication Data

US 2010/0272041 A1 Oct. 28, 2010

Related U.S. Application Data

(60) Provisional application No. 61/214,798, filed on Apr. 27, 2009.

(51) Int. Cl.
*H04L 1/00* (2006.01)
*H04L 5/00* (2006.01)

(52) U.S. Cl.
CPC .......... *H04L 1/0038* (2013.01); *H04L 5/0046* (2013.01)

(58) Field of Classification Search
None
See application file for complete search history.

(56) References Cited

U.S. PATENT DOCUMENTS

| 8,195,176 | B2* | 6/2012 | Kim | H04L 1/0025 370/329 |
| 2008/0192847 | A1 | 8/2008 | Classon et al. | |
| 2009/0154418 | A1* | 6/2009 | Kang | H04W 72/042 370/329 |
| 2009/0213803 | A1* | 8/2009 | Lee | H04W 28/16 370/329 |
| 2009/0274071 | A1* | 11/2009 | Ramesh | H04W 72/042 370/277 |
| 2010/0003996 | A1* | 1/2010 | Jun | H04W 72/044 455/450 |
| 2010/0027481 | A1* | 2/2010 | Lindh et al. | 370/329 |
| 2010/0246498 | A1* | 9/2010 | Lim | H04L 5/0007 370/329 |

(Continued)

FOREIGN PATENT DOCUMENTS

| CN | 101047880 A | 10/2007 |
| CN | 101060702 A | 10/2007 |

(Continued)

OTHER PUBLICATIONS

International Search Report dated Nov. 26, 2010 in connection with International Application No. PCT/KR2010/002659.

(Continued)

*Primary Examiner* — Chirag Shah
*Assistant Examiner* — Amar Persaud

(57) ABSTRACT

A base station comprising a transmitter configured to transmit a downlink frame. The downlink frame comprises a resource allocation region, and the resource allocation region comprises a set of resource allocation messages comprising at least one resource allocation message. All or a subset of the resource allocation messages each comprise one or more fields with an indicator, interpreted from a particular field or a combination of some or all of the one or more fields, to indicate a number of resource allocation messages intended for a particular subscriber station in the resource allocation region.

20 Claims, 11 Drawing Sheets

(56) References Cited

U.S. PATENT DOCUMENTS

| | | | |
|---|---|---|---|
| 2010/0272041 A1 | 10/2010 | Ramakrishna | |
| 2011/0002293 A1* | 1/2011 | Yuk | H04W 72/0406 370/329 |
| 2011/0092242 A1* | 4/2011 | Parkvall et al. | 455/509 |
| 2011/0188399 A1* | 8/2011 | Jung | H04B 1/713 370/252 |
| 2011/0249644 A1* | 10/2011 | Boariu | H04W 72/042 370/329 |
| 2011/0250898 A1* | 10/2011 | Mitra | H04W 72/042 455/450 |
| 2011/0299495 A1* | 12/2011 | Choi | H04L 5/0091 370/329 |
| 2011/0305219 A1* | 12/2011 | Kim | H04L 1/0027 370/329 |
| 2012/0069764 A1* | 3/2012 | Classon et al. | 370/252 |
| 2012/0147846 A1* | 6/2012 | Ho | H04W 72/042 370/330 |
| 2012/0269157 A1* | 10/2012 | Arnott et al. | 370/329 |
| 2013/0201945 A1* | 8/2013 | Sun | H04L 5/0044 370/329 |
| 2013/0322353 A1* | 12/2013 | Mitra et al. | 370/329 |
| 2013/0329674 A1* | 12/2013 | Seo | H04L 5/0007 370/329 |
| 2013/0343311 A1* | 12/2013 | Tee | H04L 5/001 370/329 |
| 2014/0161077 A1* | 6/2014 | Choi | H04W 72/042 370/329 |
| 2014/0286231 A1* | 9/2014 | Marinier | H04L 1/1841 370/315 |
| 2015/0312115 A1* | 10/2015 | Clubb | H04L 1/1635 709/203 |
| 2016/0099766 A1* | 4/2016 | Zhang | H04B 7/155 370/315 |
| 2016/0270049 A1* | 9/2016 | Walton | H04B 7/2643 |
| 2016/0337026 A1* | 11/2016 | Marinier | H04L 1/1841 |

FOREIGN PATENT DOCUMENTS

| | | |
|---|---|---|
| CN | 101064638 A | 10/2007 |
| JP | 2008-054319 | 3/2008 |
| JP | 2012 525061 A | 10/2012 |
| KR | 10-2005-0044219 | 5/2005 |
| KR | 10-2008-0108557 | 12/2008 |
| RU | 2006125654 | 1/2008 |
| RU | 2335852 | 10/2008 |
| WO | 2007119542 A1 | 10/2007 |
| WO | WO 20081004831 A2 | 1/2008 |
| WO | WO 2008/024578 A2 | 2/2008 |
| WO | WO 2008/133415 A1 | 11/2008 |
| WO | WO 2009/022297 | 2/2009 |

OTHER PUBLICATIONS

Translated Chinese Office Action dated Nov. 29, 2013 in connection with Chinese Application No. 201080024063.0; 11 pages.

Notice of Allowance dated Mar. 12, 2013 in connection with Japanses Application No. 2012-507166, 6 pages.

Decision on Grant dated Mar. 11, 2013 in connection with Russian Application No. 2011148132/07(072193); 19 pages.

Notice of Allowance dated Jun. 17, 2014 in connection with Japanese Application No. 2013-083211; 6 pages.

Translated Chinese Office Action dated Feb. 27, 2015 in connection with Chinese Application No. 2010800240630; 9 pages.

Korean Office Action and English translation issued for KR 10-2010-0039221 with mailing date of Dec. 8, 2015, 12 pgs.

Foreign Communication from a Related Counterpart Application, European Patent Application No. 10769939.9, Extended European Search Report and European Search Opinion dated Jun. 13, 2017, 7 pages.

* cited by examiner

SYSTEM AND METHOD FOR REDUCING BLIND DECODING COMPLEXITY IN OFDMA-BASED SYSTEMS

CROSS-REFERENCE TO RELATED APPLICATION(S) AND CLAIM OF PRIORITY

The present application is related to U.S. Provisional Patent Application No. 61/214,798, filed Apr. 27, 2009, entitled "METHODS FOR EFFICIENT INDICATION OF RESOURCE ALLOCATIONS TO REDUCE BLIND DECODING COMPLEXITY IN OFDMA-BASED SYSTEMS". Provisional Patent Application No. 61/214,798 is assigned to the assignee of the present application and is hereby incorporated by reference into the present application as if fully set forth herein. The present application hereby claims priority under 35 U.S.C. §119(e) to U.S. Provisional Patent Application No. 61/214,798.

TECHNICAL FIELD OF THE INVENTION

The present application relates generally to wireless communications and, more specifically, to a system and method for blind decoding of resource allocation messages.

BACKGROUND OF THE INVENTION

In a cellular communications system, a certain geographical region is divided into regions referred to as cells. The mobile stations (MSs) in each cell are served by a single base station (BS). A BS transmits information to a particular MS (or a group of MSs) in its cell on the radio path referred to as the downlink (DL), while the MSs transmit information to the BS on the radio path referred to as the uplink (UL). The transmissions on the UL and the DL may be on the same time intervals but on different frequency bands, referred to as frequency division duplexing (FDD), or on the same frequency band but during non-overlapping time intervals, referred to as time division duplexing (TDD).

In some systems, the transmissions on the DL and UL are based on Orthogonal Frequency Division Multiplexing (OFDM) modulation. In OFDM modulation, the available bandwidth for the radio link (DL or UL) is divided into a large number of smaller-bandwidth units referred to as sub-carriers (SCs) onto which the information to be transmitted is embedded.

Due to OFDM modulation on the UL, if the MSs in a cell simultaneously use non-overlapping SC sets to make transmissions to the BS, the transmission from any MS is rendered orthogonal to the transmission from any other MS when received at the BS. For example, MS(i) uses SC set {Si} to perform UL transmissions to the BS, and the SC sets used by different MSs are non-overlapping. Then, when received at the BS, the transmissions from MS(i) on SC set {Si} are not interfered with by any of the transmissions to the BS from any of the MSs j, where j≠i.

Similarly, on the DL, if the BS uses non-overlapping SCs to make simultaneous transmissions to different MSs, then at any MS, the transmissions meant for other MSs appear orthogonal to the transmissions meant for it. For example, the BS can transmit to MS(i) using SC set {Si}, and use non-overlapping SC sets to perform transmissions to various MSs. Then, when received at MS(i), the transmissions from the BS on SC set {Si} are not interfered with by any of the transmissions from the BS to any of the MSs j, where j≠i. This property of OFDM modulation allows simultaneous communications between several MSs and the BS on the UL, and the BS and several MSs on the DL.

SUMMARY OF THE INVENTION

A base station is provided. The base station comprises a transmitter configured to transmit a downlink frame. The downlink frame comprises a resource allocation region, and the resource allocation region comprises a set of resource allocation messages comprising at least one resource allocation message. All or a subset of the resource allocation messages intended for a particular subscriber station each comprise one or more fields with an indicator, interpreted from a particular field or a combination of some or all of the one or more fields, to indicate a number of resource allocation messages intended for the particular subscriber station in the resource allocation region.

A method of transmitting resource allocation messages is provided. The method comprises transmitting a downlink frame. The downlink frame comprises a resource allocation region, and the resource allocation region comprises a set of resource allocation messages comprising at least one resource allocation message. All or a subset of the resource allocation messages intended for a particular subscriber station each comprise one or more fields with an indicator, interpreted from a particular field or a combination of some or all of the one or more fields, to indicate a number of resource allocation messages intended for the particular subscriber station in the resource allocation region.

A subscriber station is provided. The subscriber station comprises a receiver configured to receive a downlink frame. The downlink frame comprises a resource allocation region, and the resource allocation region comprises a set of resource allocation messages comprising at least one resource allocation message. All or a subset of the resource allocation messages each comprise one or more fields with an indicator, interpreted from a particular field or a combination of some or all of the one or more fields, to indicate a number of resource allocation messages intended for the subscriber station in the resource allocation region.

A method of receiving resource allocation messages is provided. The method comprises receiving a downlink frame. The downlink frame comprises a resource allocation region, and the resource allocation region comprises a set of resource allocation messages comprising at least one resource allocation message. All or a subset of the resource allocation messages each comprise one or more fields with an indicator, interpreted from a particular field or a combination of some or all of the one or more fields, to indicate a number of resource allocation messages intended for a particular subscriber station in the resource allocation region.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 7A and 7B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications system.

With regard to the following description, it is noted that the LTE term "node B" is another term for "base station" used below. Further, the term "cell" is a logical concept that can represent a "base station" or a "sector" belonging to a "base station". In the present disclosure, "cell" and "base station" are used interchangeably to indicate the actual transmission units (may be "sector" or "base station" and the like) in the wireless system. Also, the LTE term "user equipment" or "UE" is another term for "subscriber station" or "mobile station" used below. It is noted that in all the following figures, some optional features are explicitly marked while some are omitted for clarity purpose.

Figure 1:
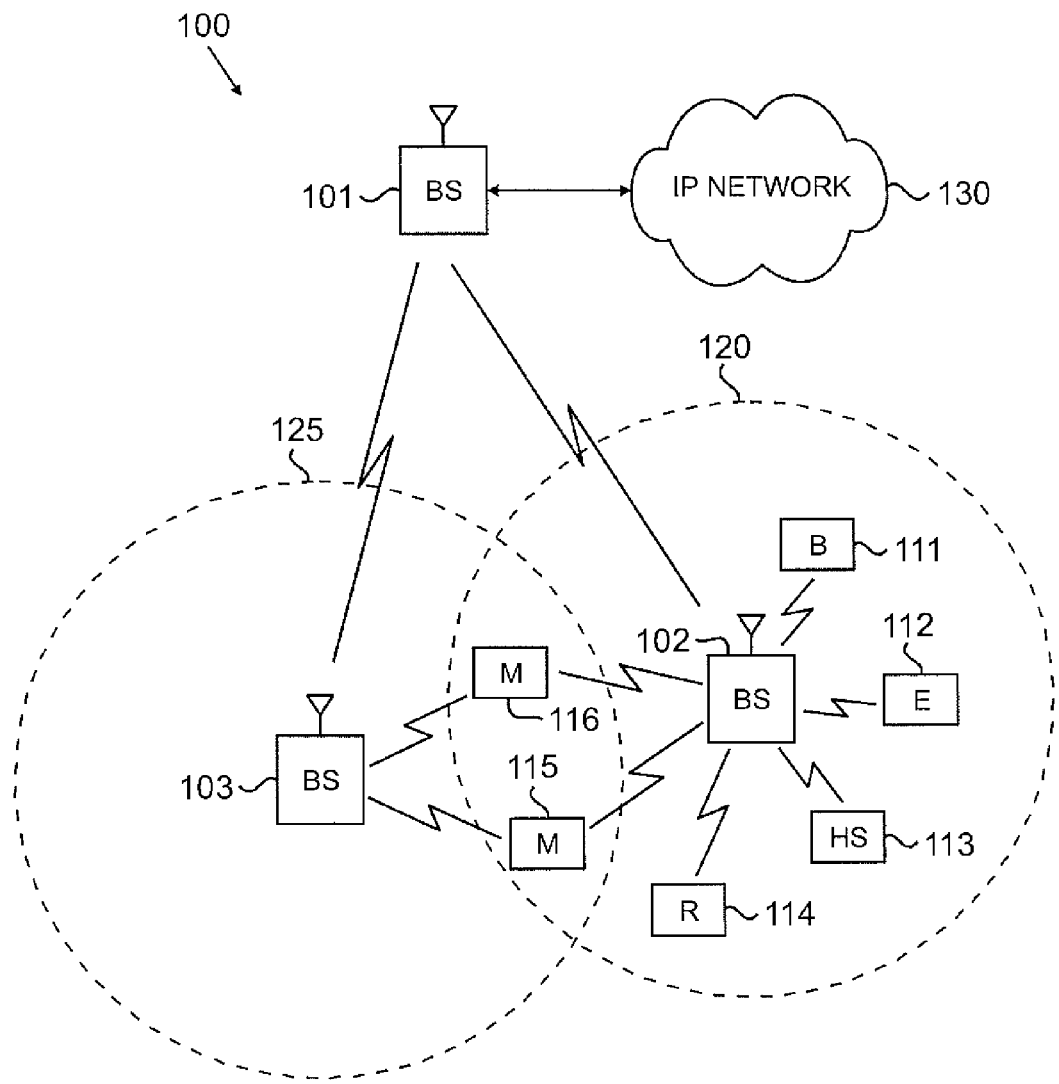
FIG. 1 illustrates an exemplary wireless network that is capable of decoding data streams according to embodiments of the present disclosure.

FIG. 1 illustrates an exemplary wireless network 100 that is capable of decoding data streams according to one embodiment of the present disclosure. In the illustrated embodiment, wireless network 100 includes base station (BS) 101, base station (BS) 102, and base station (BS) 103. Base station 101 communicates with base station 102 and base station 103. Base station 101 also communicates with Internet protocol (IP) network 130, such as the Internet, a proprietary IP network, or other data network.

Base station 102 provides wireless broadband access to network 130, via base station 101, to a first plurality of subscriber stations within coverage area 120 of base station 102. The first plurality of subscriber stations includes subscriber station (SS) 111, subscriber station (SS) 112, subscriber station (SS) 113, subscriber station (SS) 114, subscriber station (SS) 115 and subscriber station (SS) 116. Subscriber station (SS) may be any wireless communication device, such as, but not limited to, a mobile phone, mobile PDA and any mobile station (MS). In an exemplary embodiment, SS 111 may be located in a small business (B), SS 112 may be located in an enterprise (E), SS 113 may be located in a WiFi hotspot (HS), SS 114 may be located in a residence, SS 115 may be a mobile (M) device, and SS 116 may be a mobile (M) device.

Base station 103 provides wireless broadband access to network 130, via base station 101, to a second plurality of subscriber stations within coverage area 125 of base station 103.

The second plurality of subscriber stations includes subscriber station 115 and subscriber station 116. In alternate embodiments, base stations 102 and 103 may be connected directly to the Internet or other controller unit by means of a wired broadband connection, such as an optical fiber, DSL, cable or T1/E1 line, rather than indirectly through base station 101.

In other embodiments, base station 101 may be in communication with either fewer or more base stations. Furthermore, while only six subscriber stations are shown in FIG. 1, it is understood that wireless network 100 may provide wireless broadband access to more than six subscriber stations. It is noted that subscriber station 115 and subscriber station 116 are on the edge of both coverage area 120 and coverage area 125. Subscriber station 115 and subscriber station 116 each communicate with both base station 102 and base station 103 and may be said to be cell-edge devices interfering with each other. For example, the communications between BS 102 and SS 116 may be interfering with the communications between ES 103 and SS 115. Additionally, the communications between BS 103 and SS 115 may be interfering with the communications between BS 102 and SS 116.

In an exemplary embodiment, base stations 101-103 may communicate with each other and with subscriber stations 111-116 using an IEEE-802.16 wireless metropolitan area network standard, such as, for example, an IEEE-802.16e standard. In another embodiment, however, a different wireless protocol may be employed, such as, for example, a HIPERMAN wireless metropolitan area network standard. Base station 101 may communicate through direct line-of-sight or non-line-of-sight with base station 102 and base station 103, depending on the technology used for the wireless backhaul. Base station 102 and base station 103 may each communicate through non-line-of-sight with subscriber stations 111-116 using OFDM and/or OFDMA techniques.

Base station 102 may provide a T1 level service to subscriber station 112 associated with the enterprise and a fractional T1 level service to subscriber station 111 associated with the small business. Base station 102 may provide wireless backhaul for subscriber station 113 associated with the WiFi hotspot, which may be located in an airport, café, hotel, or college campus. Base station 102 may provide digital subscriber line (DSL) level service to subscriber stations 114, 115 and 116.

Subscriber stations 111-116 may use the broadband access to network 130 to access voice, data, video, video teleconferencing, and/or other broadband services. In an exemplary embodiment, one or more of subscriber stations 111-116 may be associated with an access point (AP) of a WiFi WLAN. Subscriber station 116 may be any of a number of mobile devices, including a wireless-enabled laptop computer, personal data assistant, notebook, handheld device, or other wireless-enabled device. Subscriber station 114 may be, for example, a wireless-enabled personal computer, a laptop computer, a gateway, or another device.

Dotted lines show the approximate extents of coverage areas 120 and 125, which are shown as approximately circular for the purposes of illustration and explanation only. It should be clearly understood that the coverage areas associated with base stations, for example, coverage areas 120 and 125, may have other shapes, including irregular shapes, depending upon the configuration of the base stations and variations in the radio environment associated with natural and man-made obstructions.

Also, the coverage areas associated with base stations are not constant over time and may be dynamic (expanding or contracting or changing shape) based on changing transmission power levels of the base station and/or the subscriber stations, weather conditions, and other factors. In an embodiment, the radius of the coverage areas of the base stations, for example, coverage areas 120 and 125 of base stations 102 and 103, may extend in the range from less than 2 kilometers to about fifty kilometers from the base stations.

As is well known in the art, a base station, such as base station 101, 102, or 103, may employ directional antennas to support a plurality of sectors within the coverage area. In FIG. 1, base stations 102 and 103 are depicted approximately in the center of coverage areas 120 and 125, respectively. In other embodiments, the use of directional antennas may locate the base station near the edge of the coverage area, for example, at the point of a cone-shaped or pear-shaped coverage area.

The connection to network 130 from base station 101 may comprise a broadband connection, for example, a fiber optic line, to servers located in a central office or another operating company point-of-presence. The servers may provide communication to an Internet gateway for internet protocol-based communications and to a public switched telephone network gateway for voice-based communications. In the case of voice-based communications in the form of voice-over-IP (VoIP), the traffic may be forwarded directly to the Internet gateway instead of the PSTN gateway. The servers, Internet gateway, and public switched telephone network gateway are not shown in FIG. 1. In another embodiment, the connection to network 130 may be provided by different network nodes and equipment.

In accordance with an embodiment of the present disclosure, one or more of base stations 101-103 and/or one or more of subscriber stations 111-116 include a receiver that is operable to decode a plurality of data streams received as a combined data stream from a plurality of transmit antennas using an MMSE-SIC algorithm. As described in more detail below, the receiver is operable to determine a decoding order for the data streams based on a decoding prediction metric for each data stream that is calculated based on a strength-related characteristic of the data stream. Thus, in general, the receiver is able to decode the strongest data stream first, followed by the next strongest data stream, and so on. As a result, the decoding performance of the receiver is improved as compared to a receiver that decodes streams in a random or pre-determined order without being as complex as a receiver that searches all possible decoding orders to find the optimum order.

Figure 2:
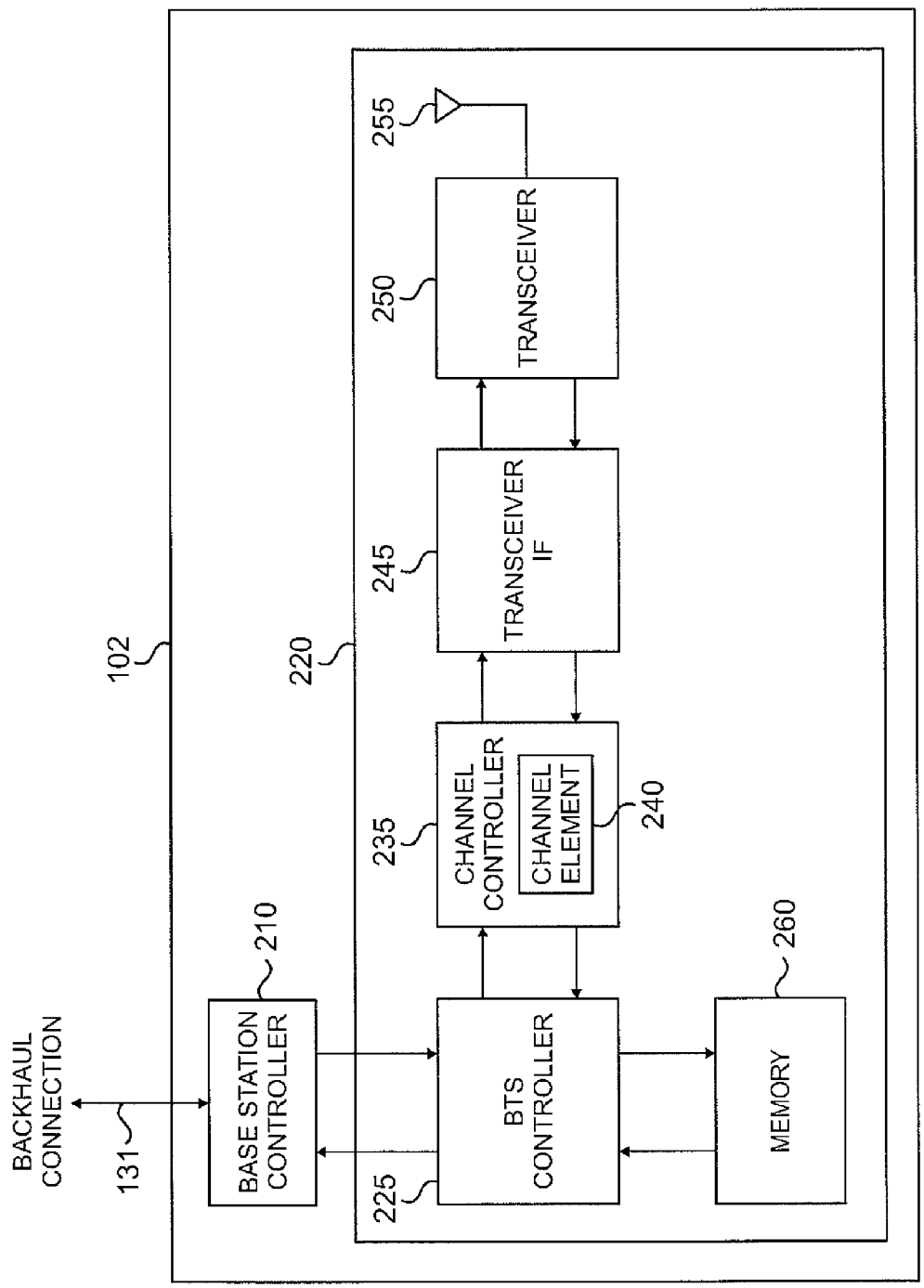
FIG. 2 illustrates an exemplary base station in greater detail according to embodiments of the present disclosure.

FIG. 2 illustrates an exemplary base station in greater detail according to one embodiment of the present disclosure. The embodiment of base station 102 illustrated in FIG. 2 is for illustration only. Other embodiments of the base station 102 could be used without departing from the scope of this disclosure.

Base station 102 comprises base station controller (BSC) 210 and base transceiver subsystem (BTS) 220. A base station controller is a device that manages wireless communications resources, including the base transceiver subsystems, for specified cells within a wireless communications network. A base transceiver subsystem comprises the RF transceivers, antennas, and other electrical equipment located in each cell site. This equipment may include air conditioning units, heating units, electrical supplies, telephone line interfaces and RF transmitters and RF receivers. For the purpose of simplicity and clarity in explaining the operation of the present disclosure, the base transceiver subsystems in each of cells 121, 122 and 123 and the base station controller associated with each base transceiver subsystem are collectively represented by BS 101, BS 102 and BS 103, respectively.

BSC 210 manages the resources in cell site 121, including BTS 220. BTS 220 comprises BTS controller 225, channel controller 235, transceiver interface (IF) 245, RF transceiver unit 250, and antenna array 255. Channel controller 235 comprises a plurality of channel elements, including exemplary channel element 240. BTS 220 also comprises a memory 260. The embodiment memory 260 included within BTS 220 is for illustration only. Memory 260 can be located in other portions of BS 102 without departing from the scope of this disclosure.

BTS controller 225 comprises processing circuitry and memory capable of executing an operating program that communicates with BSC 210 and controls the overall operation of BTS 220. Under normal conditions, BTS controller 225 directs the operation of channel controller 235, which contains a number of channel elements, including channel element 240, that perform bi-directional communications in the forward channels and the reverse channels. A forward channel refers to a channel in which signals are transmitted from the base station to the mobile station (also referred to as DOWNLINK communications). A reverse channel refers to a channel in which signals are transmitted from the mobile station to the base station (also referred to as UPLINK communications). In an advantageous embodiment of the present disclosure, the channel elements communicate according to an OFDMA protocol with the mobile stations in cell 120. Transceiver IF 245 transfers the bi-directional channel signals between channel controller 240 and RF transceiver unit 250. The embodiment of RF transceiver unit 250 as a single device is for illustration only. RF transceiver unit 250 can have separate transmitter and receiver devices without departing from the scope of this disclosure.

Antenna array 255 transmits forward channel signals received from RF transceiver unit 250 to mobile stations in the coverage area of BS 102. Antenna array 255 also sends to transceiver 250 reverse channel signals received from mobile stations in the coverage area of BS 102. In some embodiments of the present disclosure, antenna array 255 is a multi-sector antenna, such as a three-sector antenna in which each antenna sector is responsible for transmitting and receiving in a 120° arc of coverage area. Additionally, RF transceiver 250 may contain an antenna selection unit to select among different antennas in antenna array 255 during transmit and receive operations.

According to some embodiments of the present disclosure, BTS controller 225 is operable to execute programs, such as an operating system (OS) and processes for resource allocations, stored in a memory 260. Memory 260 can be any computer readable medium, for example, the memory 260 can be any electronic, magnetic, electromagnetic, optical, electro-optical, electro-mechanical, and/or other physical device that can contain, store, communicate, propagate, or transmit a computer program, software, firmware, or data for use by the microprocessor or other computer-related system or method. Memory 260 comprises a random access memory (RAM) and another part of memory 260 comprises a Flash memory, which acts as a read-only memory (ROM).

BSC 210 is operable to maintain communications between BS 102 and BS 101 and BS 103. BS 102 communicates with BS 101 and BS 103 via the wireless connection 131. In some embodiments, the wireless connection 131 is wire-line connection.

Figure 3:
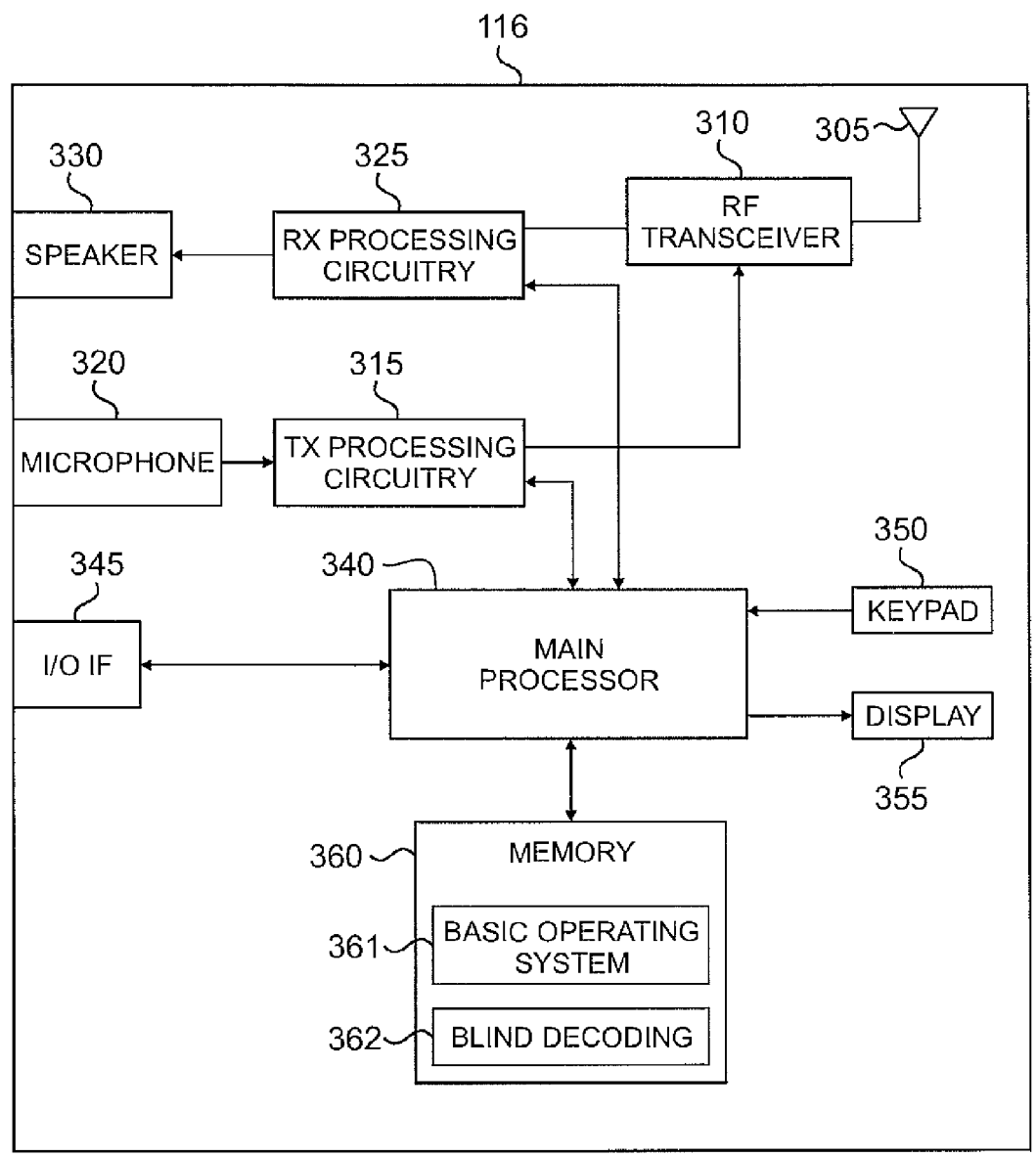
FIG. 3 illustrates an exemplary wireless mobile station according to embodiments of the present disclosure.

FIG. 3 illustrates an exemplary wireless subscriber station according to embodiments of the present disclosure. The embodiment of wireless subscriber station 116 illustrated in FIG. 3 is for illustration only. Other embodiments of the wireless subscriber station 116 could be used without departing from the scope of this disclosure.

Wireless subscriber station 116 comprises antenna 305, radio frequency (RF) transceiver 310, transmit (TX) processing circuitry 315, microphone 320, and receive (RX) processing circuitry 325. SS 116 also comprises speaker 330, main processor 340, input/output (I/O) interface (IF) 345, keypad 350, display 355, and memory 360. Memory 360 further comprises basic operating system (OS) program 361 and applications and/or instructions for decoding and interpreting resource allocations 362.

Radio frequency (RF) transceiver 310 receives from antenna 305 an incoming RF signal transmitted by a base station of wireless network 100. Radio frequency (RF) transceiver 310 down-converts the incoming RF signal to produce an intermediate frequency (IF) or a baseband signal. The IF or baseband signal is sent to receiver (RX) processing circuitry 325 that produces a processed baseband signal by filtering, decoding, and/or digitizing the baseband or IF signal. Receiver (RX) processing circuitry 325 transmits the processed baseband signal to speaker 330 (i.e., voice data) or to main processor 340 for further processing (e.g., web browsing).

Transmitter (TX) processing circuitry 315 receives analog or digital voice data from microphone 320 or other outgoing baseband data (e.g., web data, e-mail, interactive video game data) from main processor 340. Transmitter (TX) processing circuitry 315 encodes, multiplexes, and/or digitizes the outgoing baseband data to produce a processed baseband or IF signal. Radio frequency (RF) transceiver 310 receives the outgoing processed baseband or IF signal from transmitter (TX) processing circuitry 315. Radio frequency (RF) transceiver 310 up-converts the baseband or IF signal to a radio frequency (RF) signal that is transmitted via antenna 305.

In some embodiments of the present disclosure, main processor 340 is a microprocessor or microcontroller. Memory 360 is coupled to main processor 340. According to some embodiments of the present disclosure, part of memory 360 comprises a random access memory (RAM) and another part of memory 360 comprises a Flash memory, which acts as a read-only memory (ROM).

Main processor 340 executes basic operating system (OS) program 361 stored in memory 360 in order to control the overall operation of wireless subscriber station 116. In one such operation, main processor 340 controls the reception of forward channel signals and the transmission of reverse channel signals by radio frequency (RF) transceiver 310, receiver (RX) processing circuitry 325, and transmitter (TX) processing circuitry 315, in accordance with well-known principles.

Main processor 340 is capable of executing other processes and programs resident in memory 360. Main processor 340 can move data into or out of memory 360, as required by an executing process. In some embodiments, the main processor 340 is configured to execute programs, such as processes for decoding and interpreting resource allocations 362. The main processor 340 can execute processes for decoding and interpreting resource allocations 362 based on OS program 361 or in response to a signal received from BS 102. Main processor 340 is also coupled to I/O interface 345. I/O interface 345 provides subscriber station 116 with the ability to connect to other devices such as laptop computers and handheld computers. I/O interface 345 is the communication path between these accessories and main controller 340.

Main processor 340 is also coupled to keypad 350 and display unit 355. The operator of subscriber station 116 uses keypad 350 to enter data into subscriber station 116. Display 355 may be a liquid crystal display capable of rendering text and/or at least limited graphics from web sites. Alternate embodiments may use other types of displays.

In the OFDM-based system, the basic time unit over which the transmissions (from BS 102 to SS 111-116, and from SS 111-116 to BS 102) occur is called an OFDM symbol. On the UL, the transmissions by SS 111-116 are coordinated to ensure that non-overlapping SC sets are being used, and each SS has been instructed by BS 102 as to which SC set to use for transmissions to BS 102. Similarly, on the DL, BS 102 uses non-overlapping SC sets to make transmissions to SS 111-116, and the SSs are instructed by BS 102, as to which SC sets to listen to receive the transmissions meant for them.

The instructions to the SSs, whether regarding which SC set to use for UL transmissions, or which SC set on which to receive DL transmissions, are referred to as Resource Allocation Messages. The resource allocation messages are transmitted by BS 102 on an SC set referred to as the Resource Allocation Region. For example, several resource allocation messages, each meant for a particular SS or a group of SSs, are carried on SCs that are part of the Resource Allocation Region.

Each of SS 111-116 is aware of the resource allocation region, and each of SS 111-116 receives, decodes and interprets the resource allocation messages in the resource allocation region to learn about the SC set the SS is to use for UL transmissions and/or the SC set on which the SS is to receive DL transmissions.

The SC sets that are available for transmissions by BS 102 to SS 111-116 on the DL, and by SS 111-116 to BS 102 on the UL, are classified into two broad categories: distributed resources and contiguous resources. It is first noted that a logical index of a resource is the index with which it is referred to in allocations, and which, along with a convention for translation to physical resources, allows a BS or an SS to determine which physical resource to which the allocation refers.

The IEEE 802.16e system described in IEEE Std. 802.16e-2005, IEEE Standard for Local and metropolitan area networks, —Part 16: Air Interface for Fixed and Mobile Broadband Wireless Access Systems,—Amendment 2: Physical and Medium Access Control Layers for Combined Fixed and Mobile Operation in Licensed Bands, and IEEE Std. 802.16-2004/Cor1-2005, Corrigendum 1, December 2005, the contents of which hereby are incorporated by reference in their entirety, is an example of an OFDM based system employing the above descriptions. In the IEEE 802.16e system, the resource allocation messages are referred to as MAP messages and the resource allocation region is referred to as the MAP-Region.

With respect to the design and structure of the resource allocation messages in the resource allocation region, and the procedure for the SSs, such as SS 116, to decode and interpret the resource allocation messages, two broad philosophies, which are commonly followed, are discussed herein.

In a "Joint Encoding" philosophy, all of the resource allocation messages that are possibly meant for several subscriber stations are jointly encoded, modulated and transmitted on the resource allocation region. Pre-determined coding and modulation schemes, known to all of the subscriber stations, are utilized. Each individual resource allocation message contains information regarding the subscriber station (or group of subscriber stations) for which the resource allocation is meant to allocate resources. Each SS decodes this jointly encoded resource allocation to determine resource allocations for the respective subscriber stations. For example, SS 116 decodes this jointly encoded set of resource allocation messages. Having access to all the resource allocation messages, SS 116 identifies the resource allocation messages that are meant for SS 116 and consequently identifies the resources on which SS 116 is meant to transmit and/or receive transmissions. Additionally, SS 115 decodes this jointly encoded set of resource allocation messages. Also having access to all the resource allocation messages, SS 115 identifies the resource allocation messages that are meant for SS 115 and consequently identifies the resources on which SS 115 is meant to transmit and/or receive transmissions. This philosophy leads to simple decoding at the subscriber station but is wasteful of resources since it has to be ensured that the jointly encoded resource allocation message set reaches (i.e., is decodable by) all subscriber stations in the cell. For example, the IEEE 802.16e system utilizes this philosophy.

In the "MS-specific encoding, blind decoding" philosophy, each of the individual resource allocation messages are encoded, scrambled and modulated separately. The individual resource allocation messages are then embedded onto the SCs in the resource allocation region. A resource allocation message is scrambled in such a way that only the target MS or SS of the resource allocation message (i.e., the MS or SS for which the message is specifying the resource allocations) is able to decode the resource allocation message, realize that the resource allocation has been decoded correctly, and then interpret the resource allocation.

For example, consider a resource allocation message meant for SS 116. Then, only SS 116 can decode the resource allocation message (with some probability of error) and determine that the resource allocation message has been dedoded correctly. After which, SS 116 can proceed to interpret the decoded bits in the resource allocation message. Any other subscriber station, such as SS 115, when attempting to decode the resource allocation message, will be unable to do so and will realize that it is unable to decode the resource allocation message. As a result, SS 115 will realize that that message is not meant for SS 115. In this case, there will be a probability, designed to be small, that SS 115 does erroneously conclude that the message (although not meant for SS 115) was meant for SS 115.

One method of determining whether a resource allocation message was intended for a subscriber station, and whether a decode attempt on that resource allocation message was successful, is the use of a Cyclic Redundancy Check (CRC) scrambled by a subscriber station-specific bit sequence. In such a method, the first step is to calculate the value of a known linear combination of the information bits in the resource allocation message. This linear combination is referred to as the CRC. Next, the CRC value is XORed with an identification bit sequence that is unique to the intended subscriber station, where XOR refers to the binary exclusive-OR operation. This yields the scrambled CRC bit sequence. This scrambled CRC is then appended to the end of the information bits to form the complete payload in the resource allocation message. A subscriber station, after the decode attempt, then calculates the same linear combination on the resource allocation message information bits the subscriber station thinks that it has decoded. The subscriber station then XORes the calculated CRC with the scrambled CRC that was appended to the end of the information bits by the base station. Due to the property of the XOR operation, if the resource allocation message has been decoded correctly (that is, if the linear combination on the information bits calculated by the SS is correct), then this XOR operation simply yields the identification bit sequence used by the base station in constructing the scrambled CRC. If this identification sequence matches the SS's identification sequence that is known to the SS, then the SS determines that the resource allocation message has been decoded correctly and that the resource allocation message was intended for the SS. The term "CRC Check" or "Cyclic Redundancy Check" will be used in the following descriptions and the claims to refer to the above method used by a SS to determine whether a resource allocation message was intended for the SS as well as to determine whether the resource allocation message was decoded successfully. The term "CRC success" or "decode success" implies that a SS determined that a resource allocation message was intended for the SS and that the SS successfully decoded the resource allocation message as well.

The set of resource allocation message information sizes and structure (e.g., modulation and coding used) is defined and known to all subscriber stations. Each SS attempts to decode the individual resource allocation messages in the resource allocation region, iteratively trying out each of the resource allocation message structure (e.g., size, modulation, coding) hypotheses. This procedure is often referred to as blind decoding with the "blind" referring to the fact that an SS attempts the decoding with no or a very limited knowledge of the number and specific structures (e.g., size, modulation, coding) of the individual resource allocation messages in the resource allocation region. Using this philosophy, a resource allocation message can be transmitted with the optimal modulation and coding for reception by a particular SS, taking into account the radio link quality between the BS and that SS. Hence, this philosophy makes a more efficient use of the resource allocation region than the "Joint Encoding" philosophy. However, due to the requirement of the blind decoding operation, it imposes higher complexity on the SS. The LTE System 3GPP TS 36.300, "3$^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 8)", V8.7.0, December 2008, the contents of which hereby are incorporated by reference, as well as the proposed IEEE 802.16m system 802.16m-09/0010r2, Section 15.3.6.2.2.2, "Part 16—Air Interface fir Fixed and Mobile Broadband Wireless Access Systems; Advanced Air Interface (working document)", Jun. 6, 2009 (which can be obtained from http://wirelessman.org/tgm/ by following the link to the "IEEE 802.16m Amendment Working Document"), the contents of which hereby are incorporated by reference, are examples of systems that utilize this philosophy.

In the case where the MS-specific, blind decoding resource allocation message philosophy as described above is utilized, there may be situations where a BS transmits several individual resource allocation messages to a particular MS in the resource allocation region. Two examples of situations where this may happen are as follows.

In one example, the BS wants to make a resource allocation on the UL by indicating to the MS which set of SCs to transmit on the UL. The BS also wants to make a resource allocation on the DL by indicating to the MS which SCs to listen to on the DL for transmissions from the BS. In this situation, these two allocations may be carried in two separate resource allocation messages. This is an example where two different resource allocations are conveyed in two separate individual resource allocation messages.

In another example, the ES wants to make a resource allocation on the DL by indicating to the MS the SCs on which to receive BS transmissions. This resource allocation is carried on several individual resource allocation messages. The MS decodes each of the resource allocation messages, and then interprets the contents of the messages together to learn the resource allocation.

There may be several reasons why the BS uses several separate resource allocation messages (meant to be interpreted together) to convey a single resource allocation, as opposed to using a single resource allocation message to convey a single resource allocation. One possible situation is the case where, to reduce the number of hypotheses for blind decoding, there are only a small and limited set of resource allocation message sizes. In this case, large resource allocation messages may not fit into a single resource allocation message, necessitating the use of multiple resource allocation messages to convey the resource allocation. This is an example where the same resource allocation is conveyed in multiple individual resource allocation messages.

The disadvantage of the blind decoding technique, as detailed above, is that in order to learn about its resource allocations, an MS has to attempt to decode the resource allocation region in its entirety. This requirement may be made less complex by defining sub-regions within the resource allocation region, and defining a mapping between the resource allocation sub-regions and the MSs for which each sub-region carries resource allocation messages. Each MS is then informed as to which particular sub-region(s) the MS needs to blind decode over, thus reducing the complexity. However, the basic disadvantage of blind decoding still remains: each MS still has to attempt to decode its assigned resource allocation sub-region(s) in its (their) entirety.

The present disclosure provides a system and method of embedding information into one or more resource allocation messages meant for a particular MS. The information indicates other resource allocation messages in the resource allocation region also meant for the same MS.

In one embodiment of the present disclosure, in each resource allocation message meant for a particular MS, and transmitted in a resource allocation region that the MS is expected to blind decode, an indication is embedded that allows the MS to calculate the number of resource allocation messages meant for the MS in the same resource allocation region. In particular embodiments, this indicator is referred to as the NUM_MSG_IND. It is noted that in this and all of the following embodiments of the present disclosure, the indicator NUM_MSG_IND and other such indicators may be conveyed in more than a single field in the resource allocation message. The number of fields used to convey the indicator is ancillary to the actual indication action provided by the present disclosure.

For example, the effect of the NUM_MSG_IND, which in this embodiment is to allow the MS to realize the number of resource allocation messages meant for the MS in a resource allocation region, is realized by the MS by interpreting more than one field in the resource allocation message.

Figure 4A:
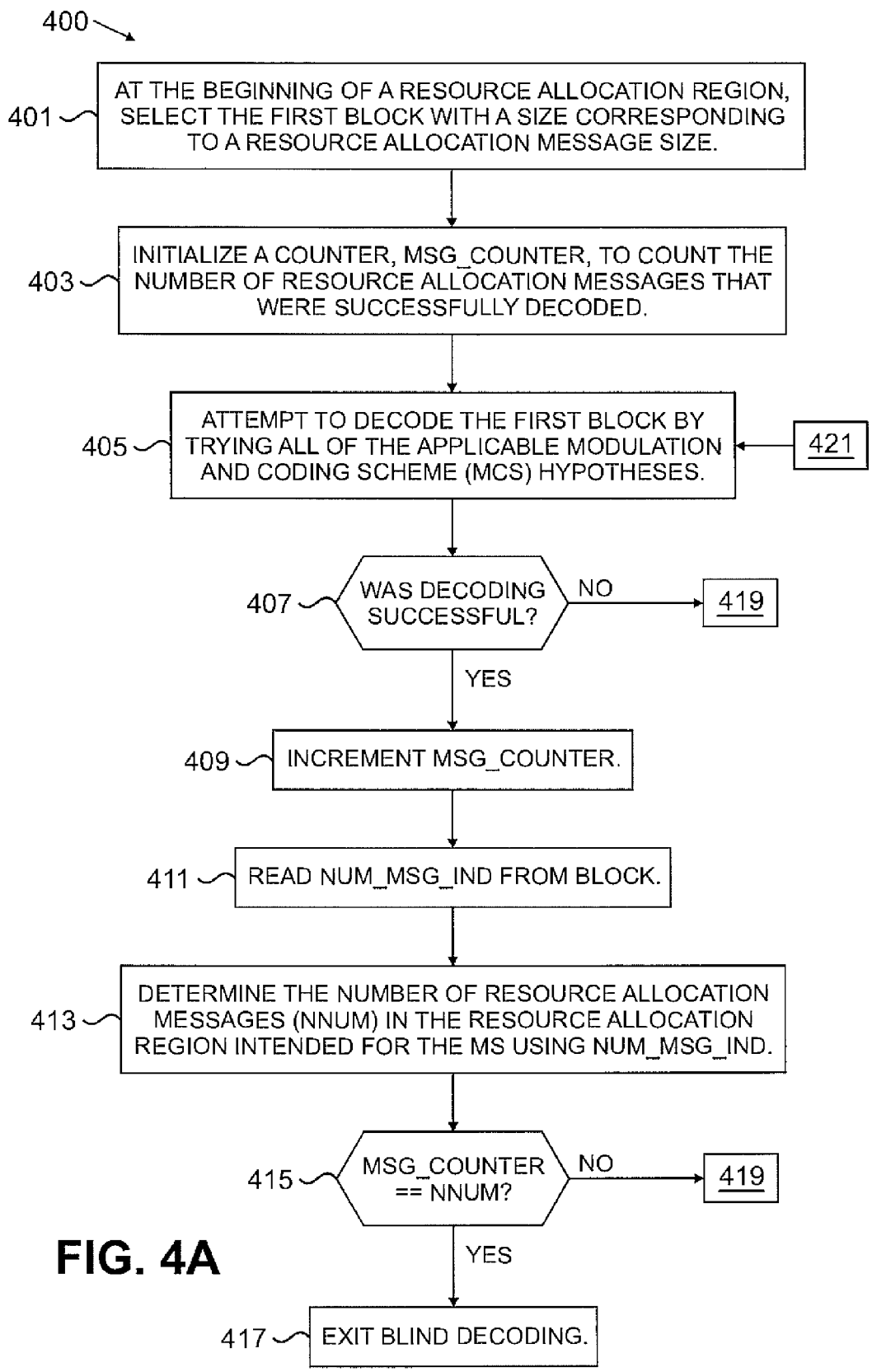
FIGS. 4A and 4B illustrate a method of blind decoding according to an embodiment of the present disclosure.
Figure 4B:
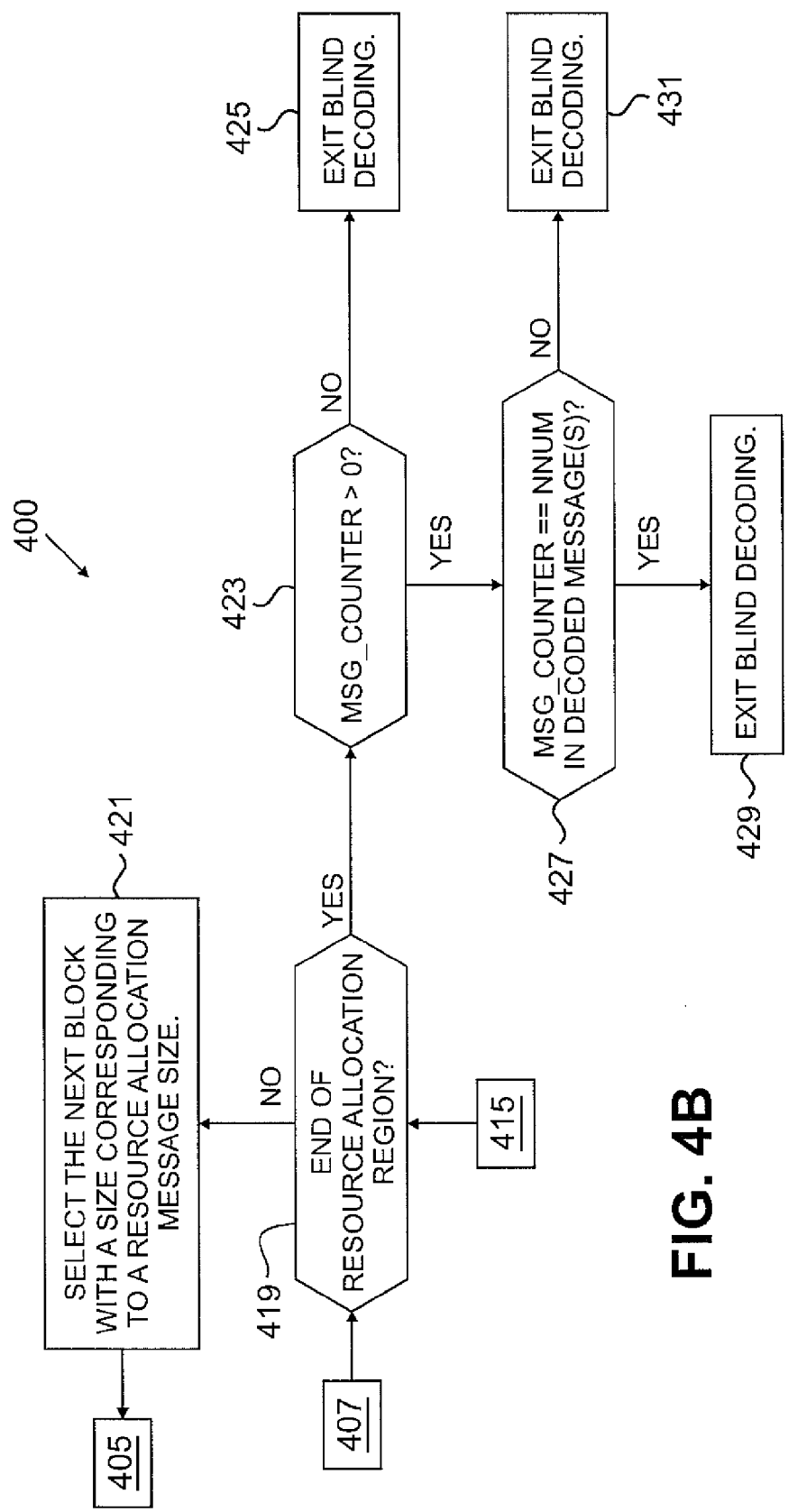

FIGS. 4A and 4B illustrate a method 400 of blind decoding according to an embodiment of the present disclosure. Although the embodiment in FIGS. 4A and 4B refer to resource allocation messages that have the same size, one of ordinary skill in the art would recognize that similar advantages are obtained in cases where the resource allocation messages have varying sizes.

As shown in FIGS. 4A and 4B, at the beginning of a resource allocation region, an MS selects the first block with a size corresponding to a resource allocation message size (block 401). The MS also initializes a counter, MSG_COUNTER, to count the number of resource allocation messages that were successfully decoded (block 403). The MS then attempts to decode the first block by trying all of the applicable modulation and coding scheme (MCS) hypotheses (block 405) and determines if the decoding was successful (block 407). If the decoding was successful, the MS increments the MSG_COUNTER (block 409). The MS also reads the NUM_MSG_IND from the first block (block 411) and determines the number of resource allocation messages (Nnum) in the resource allocation region intended for the MS (block 413). The MS then determines if the MSG_COUNTER equals Nnum (block 415). If the MSG_COUNTER equals Nnum, the MS stops blind decoding the current resource allocation region without decoding the remaining messages (block 417). The advantage of such an embodiment is that the MS terminates blind coding before the end of the current resource allocation region. This prevents resources from being wasted blind de-coding the rest of the current resource allocation region.

If the decoding was not successful (block 407) or the MSG_COUNTER does not equal Nnum (block 415), the MS then determines if the MS has reached the end of the current resource allocation region (block 419). If the MS has not reached the end of the current resource allocation region, the MS selects the next block with a size corresponding to the resource allocation message size (block 421). The MS then attempts to decode the next block by trying all of the applicable MCS hypotheses (block 405). If the MS has reached the end of the current resource allocation region, the MS determines if the MSG_COUNTER is greater than 0 (block 423). This tells the MS if at least one message has been decoded. If the MSG_COUNTER is not greater than zero, the MS stops blind decoding as there are no messages that are intended for the MS (block 425). If the MSG_COUNTER is greater than 0, the MS determines if MSG_COUNTER equals Nnum (block 427). If MSG_COUNTER equals Nnum, the MS stops blind decoding (block 429).

The advantage of stopping the blind decoding at this point is that the MS identifies that the MS has received all of the messages intended for the MS using the MSG_COUNTER and the Nnum. If MSG_COUNTER does not equal Nnum, the MS stops blind decoding (block 431). The advantage of stopping the blind decoding at this point is that having reached the end of the resource allocation region, the MS can determine that the MS has not received all of the messages intended for the MS using the MSG_COUNTER and the Nnum. In such a case, the MS can inform the BS that the MS did not receive all of the messages intended for the MS.

Figure 5A:
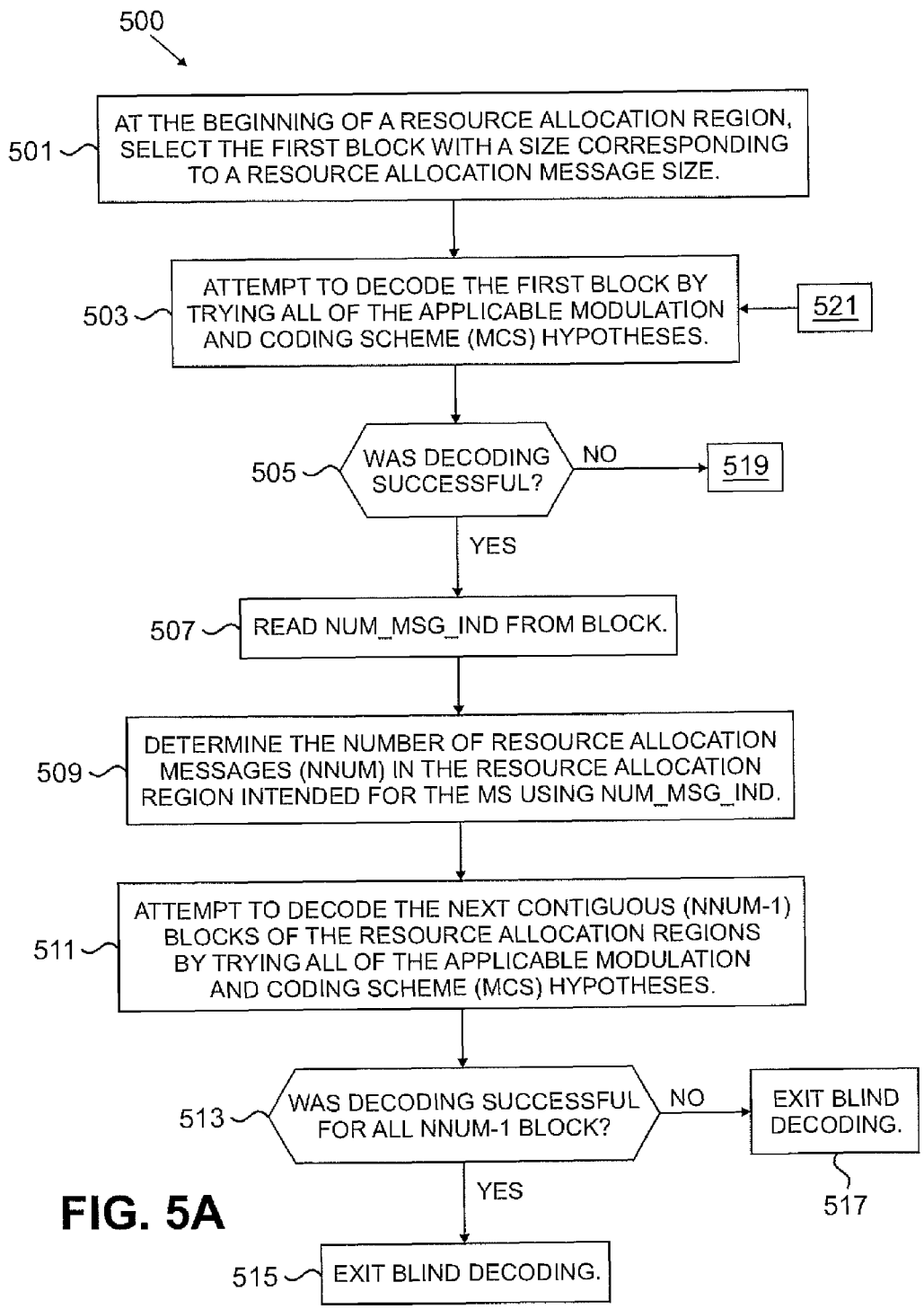
FIGS. 5A and 5B illustrate a method of blind decoding according to another embodiment of the present disclosure.
Figure 5B:
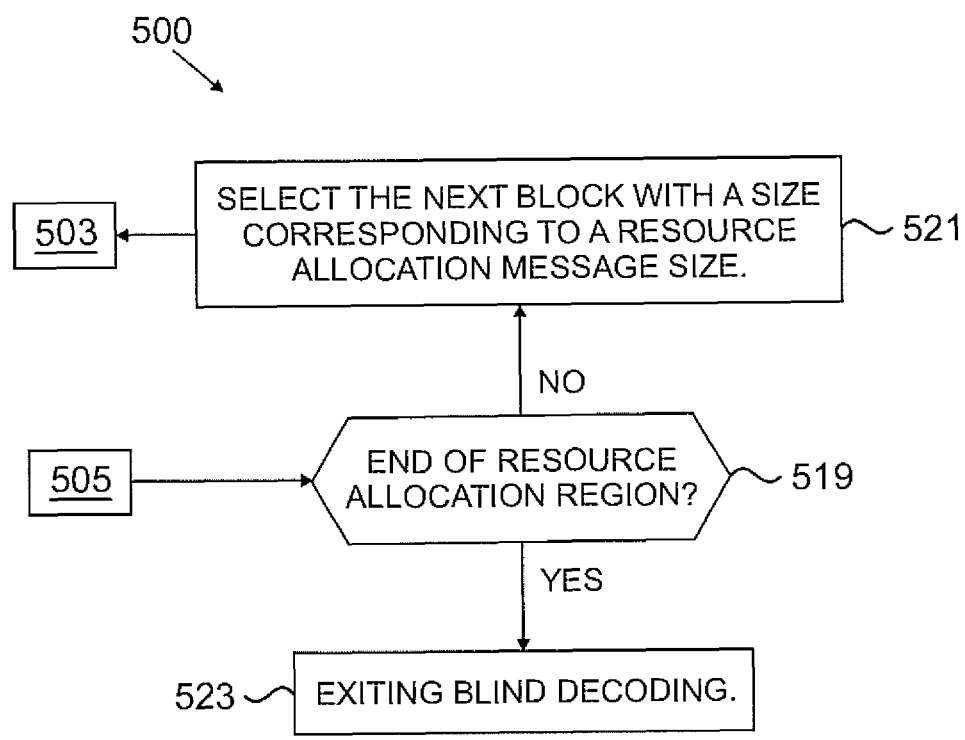

FIGS. 5A and 5B illustrate a method 500 of blind decoding according to another embodiment of the present disclosure. Although the embodiment in FIGS. 5A and 5B refers to resource allocation messages that have the same size, one of ordinary skill in the art would recognize that similar advantages are obtained in cases where the resource allocation messages have varying sizes.

In this particular embodiment, the resource allocation messages meant for a particular MS are arranged contiguously in a resource allocation region. As shown in FIGS. 5A and 5B, at the beginning of a resource allocation region, an MS selects the first block with a size corresponding to a resource allocation message size (block 501). The MS then attempts to decode the first block by trying all of the applicable modulation and coding scheme (MCS) hypotheses (block 503) and determines if the decoding was successful (block 505). If the decoding of the first block was successful, the MS reads the NUM_MSG_IND from the first block (block 507) and determines the number of resource allocation messages (Nnum) in the resource allocation region intended for the MS (block 509). The MS then attempts to decode the next contiguous (Nnum−1) blocks of the current resource allocation region (block 511) and determines if the decoding was successful for all Nnum−1 blocks (block 513). If the decoding was successful for all Nnum−1 blocks, the MS stops blind decoding the current resource allocation region and determines that all of the messages were received successfully (block 515). The advantage of such an embodiment is that the MS terminates blind coding before the end of the current resource allocation region. This prevents resources from being wasted blind coding the rest of the current resource allocation region. If the decoding was not successful for all Nnum−1 blocks, the MS stops blind decoding the current resource allocation region without decoding the remaining messages (block 517). The advantage of stopping the blind decoding at this point is that the MS can determine that the MS has not received all of the messages intended for the MS. In such a case, the MS can inform the BS that the MS did not receive all of the messages intended for the MS.

If the decoding of the first block was not successful, the MS then determines if the MS has reached the end of the current resource allocation region (block 519). If the MS has not reached the end of the current resource allocation region, the MS selects the next block with a size corresponding to the resource allocation message size (block 521). The MS then attempts to decode the next block by trying all of the applicable MCS hypotheses (block 503). If the MS has reached the end of the current resource allocation region, the MS determines that there are no messages in the current resource allocation region that are intended for the MS and stops blind decoding (block 523).

Figure 6A:
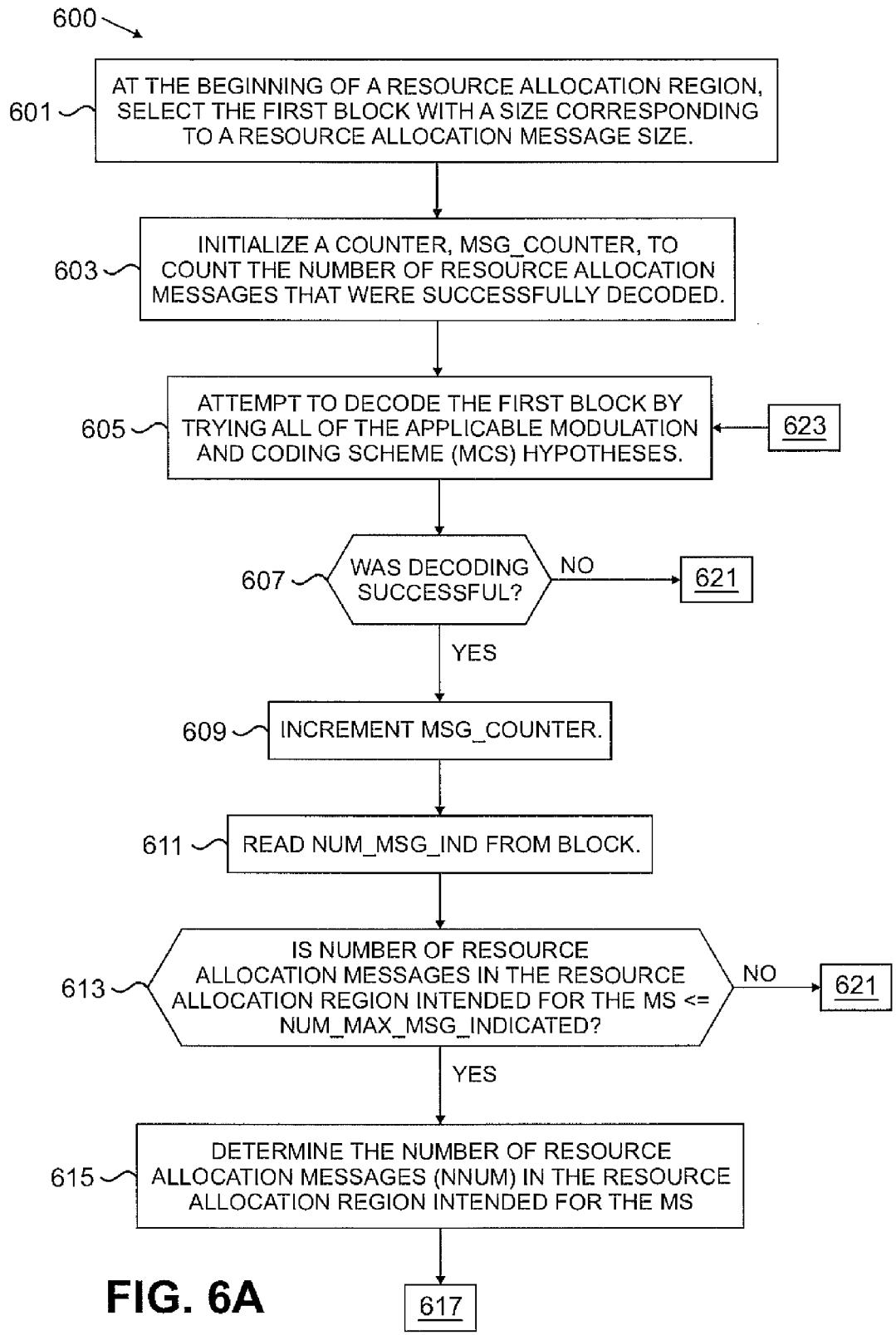
FIGS. 6A and 6B illustrate a method of blind decoding according to a further embodiment of the present disclosure.
Figure 6B:
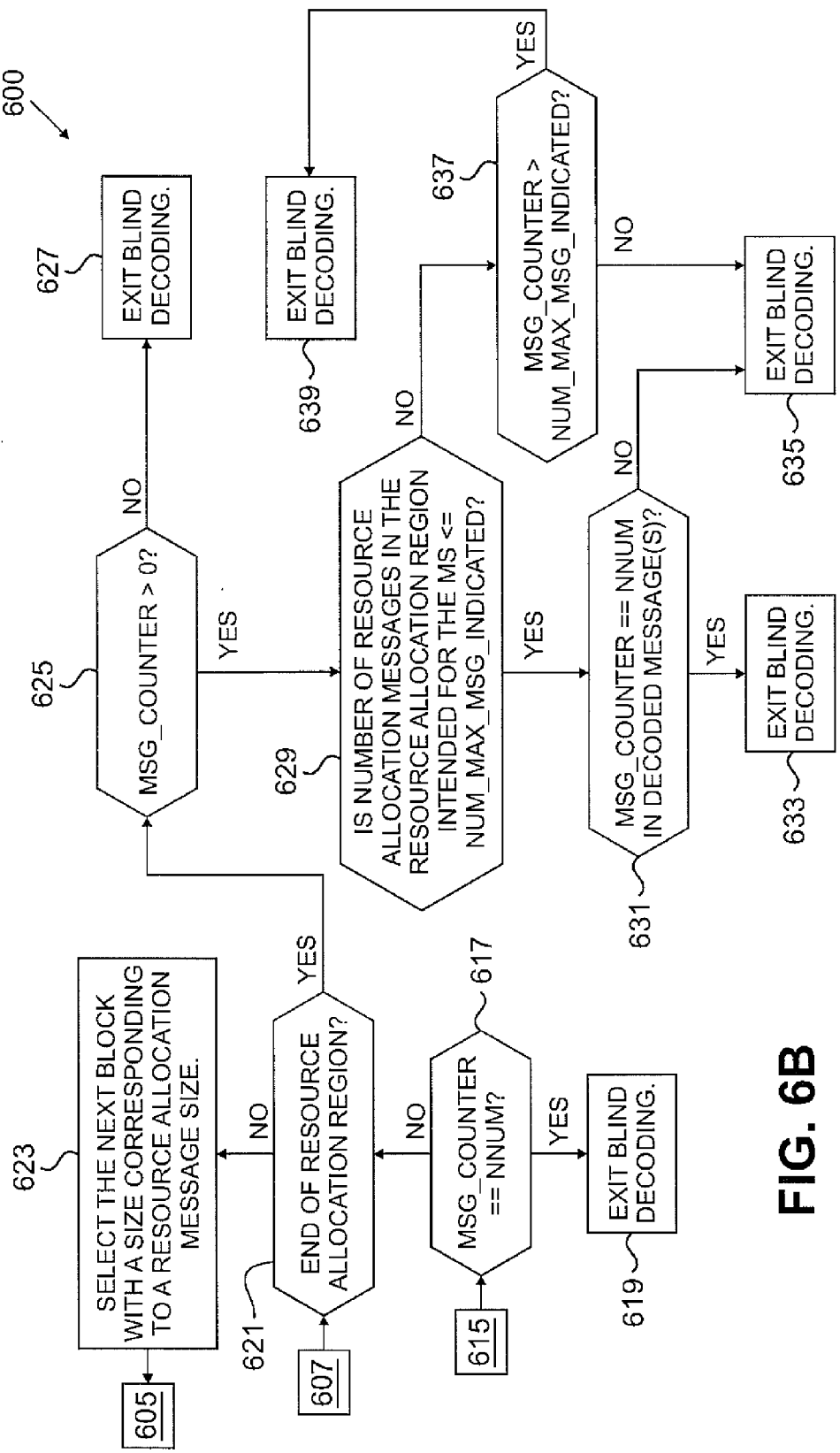

FIGS. 6A and 6B illustrate a method 600 of blind decoding according to a further embodiment of the present disclosure. Although the embodiment in FIGS. 6A and 6B refer to resource allocation messages that have the same size, one of ordinary skill in the art would recognize that similar advantages are obtained in cases where the resource allocation messages have varying sizes.

In this embodiment, the indicator NUM_MSG_IND, instead of indicating the actual number of resource allocation messages meant to be blind decoded by the MS, indicates whether or not the number of resource allocation messages in the resource allocation region meant for the MS is less than or equal to a number known to both the MS and the BS. In particular embodiments, the known number is referred to as NUM_MAX_MSG_INDICATED. In the case that the number of resource allocation messages in the resource allocation region meant for the MS is less than or equal to NUM_MAX_MSG_INDICATED, the NUM_MSG_IND indicates this actual number of resource allocation messages. This embodiment of the invention is useful in the case that there are limitations on the number of bits in the resource allocation message that may be used to convey NUM_MSG_IND.

As shown in FIGS. 6A and 6B, at the beginning of a resource allocation region, an MS selects the first block with a size corresponding to a resource allocation message size (block 601). The MS also initializes a counter, MSG_COUNTER, to count the number of resource allocation messages that were successfully decoded (block 603). The MS then attempts to decode the first block by trying all of the applicable modulation and coding scheme (MCS) hypotheses (block 605) and determines if the decoding was successful (block 607). If the decoding was successful, the MS increments the MSG_COUNTER by one (block 609). The MS also extracts the NUM_MSG_IND from the first block (block 611) and determines if the number of resource allocation messages in the resource allocation region intended for the MS is less than or equal to the NUM_MAX_MSG_INDICATED (block 613). If the resource allocation region intended for the MS is less than or equal to the NUM_MAX_MSG_INDICATED, the MS determines the number of resource allocation messages (Nnum) in the resource allocation region intended for the MS (block 615). The MS then determines if the MSG_COUNTER equals Nnum (block 617). If the MSG_COUNTER equals Nnum, the MS stops blind decoding the current resource allocation region without decoding the remaining messages (block 619). The advantage of such an embodiment is that the MS terminates blind coding before the end of the current resource allocation region. This prevents resources from being wasted blind coding the rest of the current resource allocation region.

If the decoding was not successful (block 607), the number of resource allocation messages in the resource allocation region intended for the MS is not less than or equal to the NUM_MAX_MSG_INDICATED (block 613), or the MSG_COUNTER does not equal Nnum (block 617), the MS then determines if the MS has reached the end of the current resource allocation region (block 621). If the MS has not reached the end of the current resource allocation region, the MS selects the next block with a size corresponding to the resource allocation message size (block 623).

The MS then attempts to decode the next block by trying all of the applicable MCS hypotheses (block 605). If the MS has reached the end of the current resource allocation region, the MS determines if the MSG_COUNTER is greater than 0 (block 625). This tells the MS if at least one message has been decoded. If the MSG_COUNTER is not greater than zero, the MS stops blind decoding as there are no messages that are intended for the MS and the end of the resource allocation region has been reached (block 627). If the MSG_COUNTER is greater than 0, the MS determines if the number of resource allocation messages in the resource allocation region intended for the MS is less than or equal to the NUM_MAX_MSG_INDICATED (block 629). If the number of resource allocation messages in the resource allocation region intended for the MS is less than or equal to the NUM_MAX_MSG_INDICATED, the MS determines if the MSG_COUNTER equals Nnum in the decoded messages (block 631). If the MSG_COUNTER equals Nnum in the decoded messages, the MS stops blind decoding (block 633). The advantage of stopping the blind decoding at this point is that the MS identifies that the MS has received all of the messages intended for the MS using the MSG_COUNTER and the Nnum. If MSG_COUNTER does not equal Nnum, the MS stops blind decoding (block 635). The advantage of stopping the blind decoding at this point is that the MS can determine that the MS has not received all of the messages intended for the MS using the MSG_COUNTER and the Nnum. In such a case, the MS can inform the BS that the MS did not receive all of the messages intended for the MS. If the number of resource allocation messages in the resource allocation region intended for the MS is not less than or equal to the NUM_MAX_MSG_INDICATED, the MS determines if the MSG_COUNTER is greater than NUM_MAX_MSG_INDICATED (block 637). If the MSG_COUNTER is not greater than NUM_MAX_MSG_INDICATED, the MS stops blind decoding (block 635), and determines that an error condition has occurred as a result of a failure to successfully decode all of the messages. This error condition can be reported back to the base station. If the MSG_COUNTER is greater than NUM_MAX_MSG_INDICATED, the MS determines that that no error condition was detected and stops blind decoding (block 637).

Figure 7A:
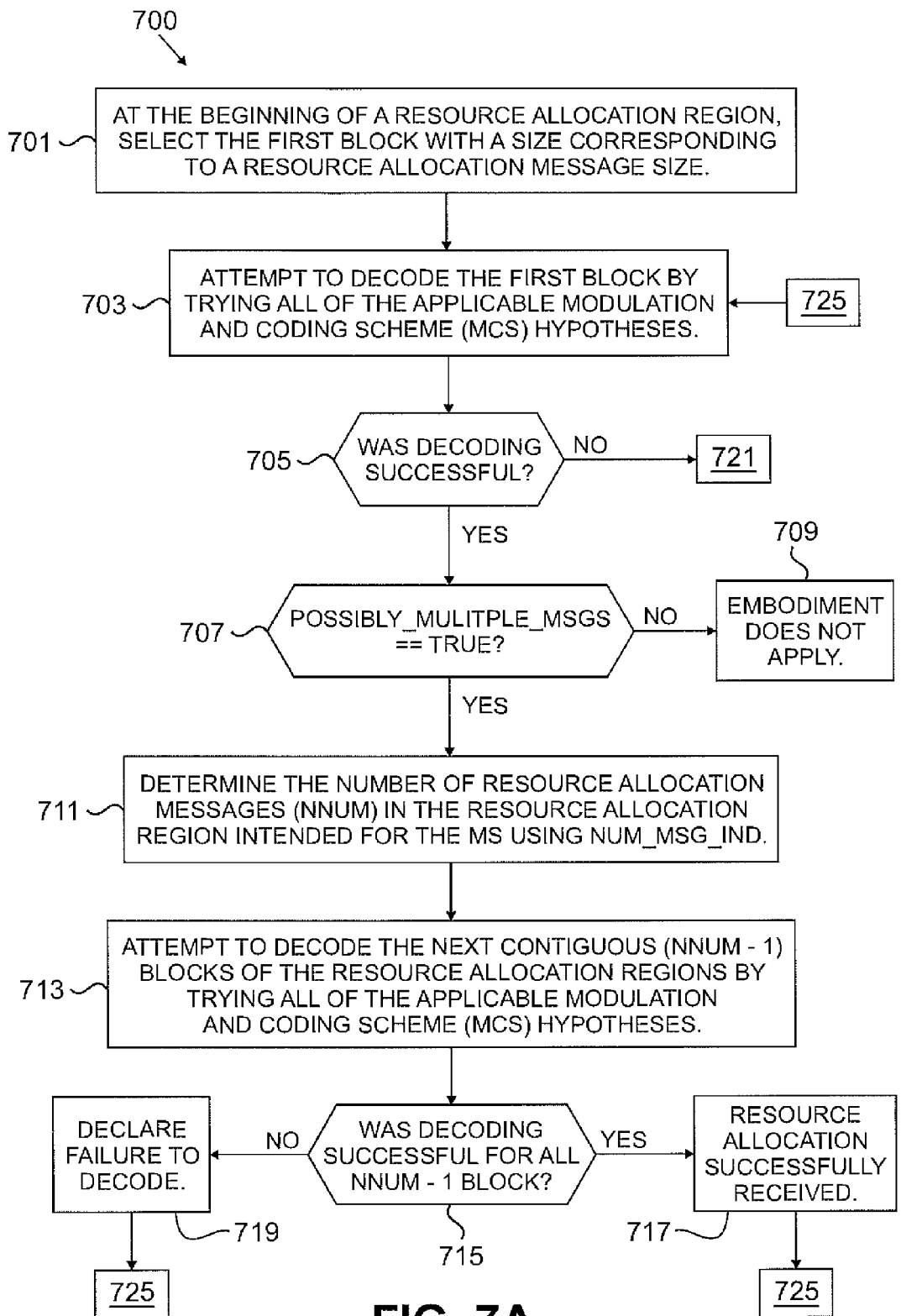
FIGS. 7A and 7B illustrate a method of blind decoding according to yet another embodiment of the present disclosure.
Figure 7B:
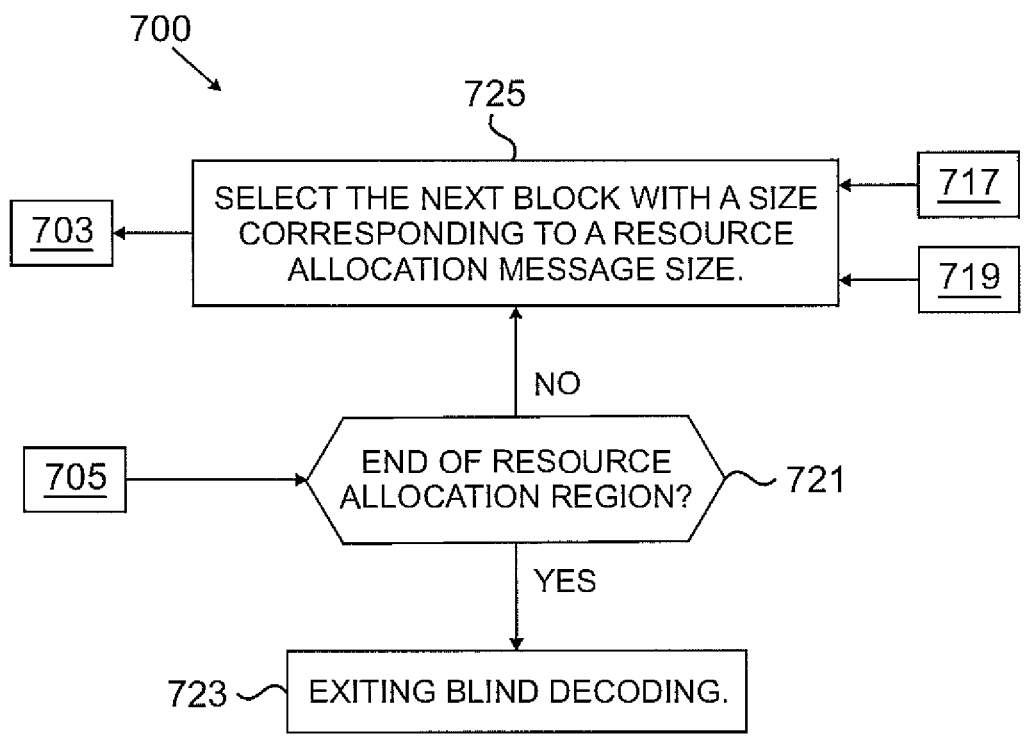

FIGS. 7A and 7B illustrate a method 700 of blind decoding according to yet another embodiment of the present disclosure. Although the embodiment in FIGS. 7A and 7B refer to resource allocation messages that have the same size, one of ordinary skill in the art would recognize that similar advantages are obtained in cases where the resource allocation messages have varying sizes.

In this embodiment, a particular resource allocation may be conveyed in more than a single resource allocation message. In such an embodiment:

(a) the resource allocation messages conveying the (same) resource allocation are arranged contiguously in the resource allocation region;

(b) each resource allocation message conveying the (same) resource allocation contains an indicator that allows an MS to infer that the resource allocation being conveyed is of a kind that may be carried over multiple resource allocation messages. In particular embodiments, this indicator is referred to as the POSSIBLY_MULTIPLE_MSGS indicator. It is noted that the POSSIBLY_MULTIPLE_MSGS indicator may be implicit. The MS may be able to infer from some other information in the contents of the resource allocation message, which are not explicitly meant to indicate that the resource allocation may be conveyed by multiple resource allocation messages, that the resource allocation may indeed be of a kind that may be conveyed on several resource allocation messages;

(c) each resource allocation message conveying the (same) allocation contains an indicator, referred to as the NUM_MSG_IND, allowing the MS to calculate the number of resource allocation messages conveying the resource allocation.

As shown in FIGS. 7A and 7B, at the beginning of a resource allocation region, an MS selects the first block with a size corresponding to a resource allocation message size (block 701). The MS then attempts to decode the first block by trying all of the applicable modulation and coding scheme (MCS) hypotheses (block 703) and determines if the decoding was successful (block 705). If the decoding of the first block was successful, MS determines if the POSSIBLY_MULTIPLE_MSGS indicator is set to a true or positive value (block 707). If the POSSIBLY_MULTIPLE_MSGS indicator is not set to a true or positive value, the MS determines that method 700 does not apply (block 709). If the POSSIBLY_MULTIPLE_MSGS indicator is set to a true or positive value, the MS determines the number of resource allocation messages (Nnum) over which the current resource allocation is being conveyed (block 711). The MS then attempts to decode the next contiguous (Nnum−1) blocks of the current resource allocation region (block 713) and determines if the decoding was successful for all Nnum−1 blocks (block 715). If the decoding was successful for all Nnum−1 blocks, the MS determines that the resource allocation was received successfully (block 717).

If the decoding was not successful for all Nnum−1 blocks, the MS determines that the MS has failed to decode the current resource allocation (block 719). The advantage of this determination is that the MS can inform the BS that the MS did not receive all of the messages intended for the MS.

If the decoding of the first block was not successful, the MS then determines if the MS has reached the end of the current resource allocation region (block 721). If the MS has reached the end of the current resource allocation region, the MS determines that there are no messages in the current resource allocation region that are intended for the MS and stops blind decoding (block 723).

If the MS has not reached the end of the current resource allocation region, or after the MS determines that the resource allocation was received successfully (block 717), or after the MS declares failure to decode the current resource allocation (block 719), the MS selects the next block with a size corresponding to the resource allocation message size (block 725). The MS then attempts to decode the next block by trying all of the applicable MCS hypotheses (block 703).

In yet a further embodiment, the indicator NUM_MSG_IND, instead of indicating the actual number of resource allocation messages that convey the resource allocation, indicates whether or not the number of resource allocation messages conveying the resource allocation is less than or equal to a number known to both the MS and the BS. In particular embodiments, the known number is referred to as NUM_MAX MSG_INDICATED. In the case that the number of resource allocation messages conveying the resource allocation is less than or equal to NUM_MAX_MSG_INDICATED, the NUM_MSG_IND indicates this actual number of resource allocation messages.

This embodiment is useful in the case that there are limitations on the number of bits in the resource allocation message that may be used to convey NUM_MSG_IND.

In yet still a further embodiment, the NUM_MSG_IND indicator may not be present in all of the resource allocation messages.

It should be noted that further embodiments of the present disclosure may be derived by utilizing a combination of the embodiments provided in this present disclosure.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for transmitting resource allocation messages by a base station, the method comprising:
    allocating at least one sub band to a mobile station; and
    transmitting, to the mobile station, a resource allocation message comprising a mode indicator,
    wherein the mode indicator indicates a number of resource allocation messages used for indicating the at least one sub band, wherein the number of resource allocation messages used for indicating the at least one sub band is one or more and the resource allocation message comprising the mode indicator is one of the number of resource allocation messages used for indicating the at least one sub band.

2. The method in accordance with claim 1, wherein, if the number of the resource allocation messages used is two or more, each of the two or more resource allocation messages comprises the mode indicator.

3. The method in accordance with claim 2, wherein the two or more resource allocation messages are contiguous in a resource allocation region.

4. The method in accordance with claim 2, wherein each of the two or more resource allocation messages further comprises at least one field for indicating a particular mobile station.

5. The method in accordance with claim 1, wherein, if the number of the resource allocation messages is less than or equal to a threshold number, the mode indicator indicates the number of the resource allocation messages used for indicating the at least one sub band.

6. A method for receiving resource allocation messages by a mobile station, the method comprising:
    receiving, from a base station, a resource allocation message comprising a mode indicator, when at least one sub band is allocated to the mobile station,
    wherein the mode indicator indicates a number of resource allocation messages used for indicating the at least one sub band, wherein the number of resource allocation messages used for indicating the at least one sub band is one or more and the resource allocation message comprising the mode indicator is one of the number of resource allocation messages used for indicating the at least one sub band.

7. The method in accordance with claim 6, wherein, if the number of the resource allocation messages used is two or more, each of the two or more resource allocation messages comprises the mode indicator.

8. The method in accordance with claim 7, wherein the two or more resource allocation messages are contiguous in a resource allocation region.

9. The method in accordance with claim 7, wherein each of the two or more resource allocation messages further comprises at least one field for indicating a particular mobile station, and
    if the number of the resource allocation message is two or more, the number of the two or more resource allocation messages is indicated by the mode indicator and the at least one field.

10. The method in accordance with claim 6, wherein, if the number of the resource allocation messages is less than or equal to a threshold number, the mode indicator indicates the number of the resource allocation messages used for indicating the at least one sub band.

11. A base station comprising:
    a controller configured to allocate at least one sub band to a mobile station; and
    a transmitter configured to transmit, to the mobile station, a resource allocation message comprising a mode indicator,
    wherein the mode indicator indicates a number of resource allocation messages used for indicating the at least one sub band, wherein the number of resource allocation messages used for indicating the at least one sub band is one or more and the resource allocation message comprising the mode indicator is one of the number of resource allocation messages used for indicating the at least one sub band.

12. The base station in accordance with claim 11, wherein, if the number of the resource allocation messages used is two or more, each of the two or more resource allocation messages comprises the mode indicator.

13. The base station in accordance with claim 12, wherein the two or more resource allocation messages are contiguous in a resource allocation region.

14. The base station in accordance with claim 12, wherein each of the two or more resource allocation messages further comprises at least one field for indicating a particular mobile station.

15. The base station in accordance with claim 11, wherein, if the number of the resource allocation messages is less than or equal to a threshold number, the mode indicator indicates the number of the resource allocation messages used for indicating the at least one sub band.

16. A mobile station comprising:
    a processor configured to control one or more functions of the mobile station; and
    a receiver coupled to the processor and configured to receive, from a base station, a resource allocation message comprising a mode indicator, when at least one sub band is allocated to the mobile station,
    wherein the mode indicator indicates a number of resource allocation messages used for indicating the at least one sub band, wherein the number of resource allocation messages used for indicating the at least one sub band is one or more and the resource allocation message comprising the mode indicator is one of the number of resource allocation messages used for indicating the at least one sub band.

17. The mobile station in accordance with claim 16, wherein, if the number of the resource allocation messages used is two or more, each of the two or more resource allocation messages comprises the mode indicator.

18. The mobile station in accordance with claim 17, wherein the two or more resource allocation messages are contiguous in a resource allocation region.

19. The mobile station in accordance with claim 17, wherein each of the two or more resource allocation messages further comprises at least one field for indicating a particular mobile station, and
    if the number of the resource allocation message is two or more, the number of the two or more resource allocation messages is indicated by the mode indicator and the at least one field.

20. The mobile station in accordance with claim 16, wherein, if the number of the resource allocation messages is less than or equal to a threshold number, the mode indicator indicates the number of the resource allocation messages used for indicating the at least one sub band.

* * * * *